US009932014B2

(12) United States Patent
Müller

(10) Patent No.: US 9,932,014 B2
(45) Date of Patent: Apr. 3, 2018

(54) CELLULAR PHONE FOR REMOTELY CONTROLLING A FUNCTION OF A SECURITY DEVICE OF A MOTOR VEHICLE

(71) Applicant: HUF HÜLSBECK & FÜRST GMBH & CO. KG, Velbert (DE)

(72) Inventor: Ulrich Müller, Velbert (DE)

(73) Assignee: HUF HÜLSBECK & FÜRST GMBH & CO. KG, Velbert (DE)

( * ) Notice: Subject to any disclaimer, the term of this patent is extended or adjusted under 35 U.S.C. 154(b) by 52 days.

(21) Appl. No.: 14/654,110

(22) PCT Filed: Dec. 18, 2013

(86) PCT No.: PCT/EP2013/077126
§ 371 (c)(1),
(2) Date: Aug. 21, 2015

(87) PCT Pub. No.: WO2014/096025
PCT Pub. Date: Jun. 26, 2014

(65) Prior Publication Data
US 2015/0353051 A1 Dec. 10, 2015

(30) Foreign Application Priority Data

Dec. 20, 2012 (DE) .................. 10 2012 112 808

(51) Int. Cl.
*B60R 25/24* (2013.01)
*H04W 12/06* (2009.01)
*H04B 1/3822* (2015.01)
*G08C 17/02* (2006.01)

(52) U.S. Cl.
CPC ............ *B60R 25/241* (2013.01); *G08C 17/02* (2013.01); *H04B 1/3822* (2013.01); *H04W 12/06* (2013.01); *G08C 2201/61* (2013.01); *G08C 2201/93* (2013.01)

(58) Field of Classification Search
None
See application file for complete search history.

(56) References Cited

U.S. PATENT DOCUMENTS

| 2002/0080083 | A1  | 6/2002  | Nantz |
| 2011/0102164 | A1* | 5/2011  | Ghabra .................. B60R 25/04 340/426.13 |
| 2013/0141212 | A1* | 6/2013  | Pickering ................ G05B 1/01 340/5.61 |
| 2013/0259232 | A1* | 10/2013 | Petel ................... H04L 63/0492 380/270 |

FOREIGN PATENT DOCUMENTS

| GB | 2 402 840 A |   | 12/2004 |              |
| GB | 2 480 685 A |   | 11/2011 |              |
| GB | 2 487 447 A |   | 7/2012  |              |
| GB | 2487447 A   | * | 7/2012  | ......... G07C 9/00309 |

OTHER PUBLICATIONS

International Search Report issued in International Patent Application No. PCT/EP2013/077126, dated Mar. 11, 2014.

* cited by examiner

*Primary Examiner* — Shelley Chen
(74) *Attorney, Agent, or Firm* — Andrews Kurth Kenyon LLP; Michael Ye

(57) ABSTRACT

The invention relates to a cellular phone (10) for remotely controlling at least one function of a security device (12) of a motor vehicle (11). The cellular phone (10) has a first transceiver unit (14), whereby a connection can be established to a cellular network (16). According to the invention, the cellular phone (10) has a second transceiver unit (18), by means of which a first radio signal (20) can be received. The cellular phone (10) can be switched into an active mode by means of the received first radio signal (20), and a second radio signal (22) with an authorization code (21) can be transmitted by means of the second transceiver unit (18) in the switched active mode in order to control the function of the security device (12).

15 Claims, 2 Drawing Sheets

Figure 1:
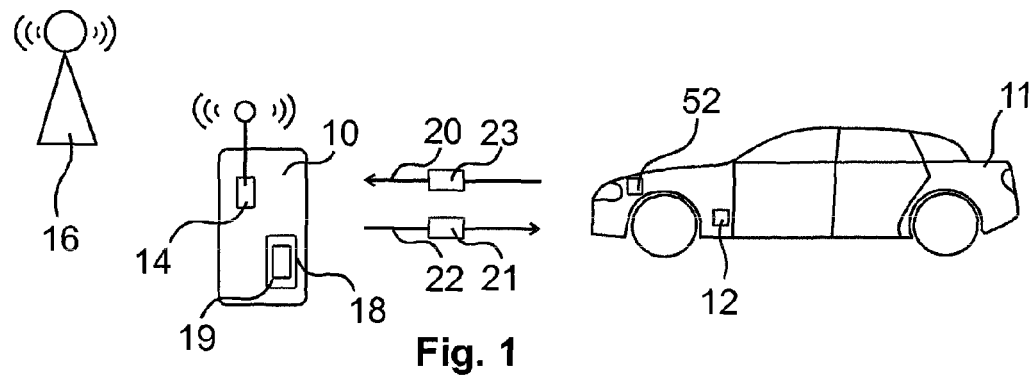

CELLULAR PHONE FOR REMOTELY CONTROLLING A FUNCTION OF A SECURITY DEVICE OF A MOTOR VEHICLE

The invention relates to a cellular phone for controlling at least one function of a security device of a vehicle according to the general term of claim 1. Further, the invention relates to a method for remotely controlling at least one function of a security device of a vehicle according to the general term of claim 8. Moreover, the invention relates to a system for remotely controlling at least one function of a security device of a vehicle with a cellular phone disclosed according to claim 14.

As it is known cellular phones are used for mobile communication. The cellular phone comprises an ultra-high frequency interface with which a connection with a cellular network can be established. More and more fields of application result which are feasible with a cellular phone, particularly a smartphone.

It is object of the present invention to provide a cellular phone which is improved in its functionality.

For solving this objective a device according to the features of claim 1 and a method with the features of claim 8 and a system with the features of claim 14 are proposed. In the dependent claims preferred improvements of the invention are described.

According to the invention it is intended that the cellular phone comprises a first transceiver unit wherein a connection with a cellular network can be established and additionally comprises a second transceiver unit wherein a first radio signal can be received. The cellular phone can be switched in an active mode by the received first radio signal. In the switched active mode a second radio signal with an authorization code for controlling the function of the security device can be sent by a second transceiver unit. Via the first transceiver unit of the cellular phone a connection with the cellular network can be established. The establishment of the connection with the cellular network and the transmission of a second radio signal can thereby occur at the same time. The establishment of a connection with the cellular network for a mobile communication or a mobile data connection via the cellular network can occur via an UHF interface (ultra-high frequency interface). A UHF frequency band is defined from 0.3 GHz to 3 GHz. Thus, it can be operated in a frequency range from 890 MHz to 915 MHz. The establishment of a mobile connection can occur via a connection protocol wherein the connection protocol can be implemented in the cellular phone and on the side of the cellular network, particularly on the side of a base station. Thereby, different data between the cellular phone and the basis station can be exchanged. For example, for the log-in of the cellular phone into the cellular network an authentication can occur via an exchange of a key. This key can be saved on a SIM card wherein the SIM card is electrically connected to the cellular phone. The key can be read out by the cellular phone and can be transmitted to the cellular network, wherein an authentication of the cellular phone can occur. In connection with this a mobile communication connection or data connection can occur. In case the cellular phone is already logged-in to the cellular network it can take multiple seconds until for example a communication connection is established. Due to this, according to the invention, a second transceiver unit is implemented into the cellular phone. As soon as a second transceiver unit receives the first radio signal, wherein with the first radio signal a specific frequency can be involved, particularly a carrier frequency, the cellular phone is directly turned into an active mode. A carrier frequency is a frequency, wherein information can be modulated to the frequency. If the cellular phone is in its active mode, a second radio signal is sent directly and without substantial delay with an authorization code for controlling of the function of the security device. The cellular phone reacts directly with the receipt of the first radio signal. Connection protocols can remain unconsidered. This enables a direct action of the cellular phone by receiving a certain frequency. Therewith, a passive-entry-system can be realized easily and effectively. Information can be modulated to the first radio signal so that the cellular phone can be switched into an active mode only on particular carrier frequencies with certain information, particularly encoded information.

It is preferably an advantage that the second transceiver unit comprises a LF-module. The LF-module can operate in an LF frequency band with a frequency range of 30 kHz to 300 kHz. Therewith, a LF alarm can be received by a second transceiver unit. The LF alarm can thereby preferably comprise a frequency of 125 kHz, wherein the LF alarm can be received by the second transceiver unit as a first radio signal. This alarm turns the cellular phone into the active mode. Thereupon, a second radio signal with an authorization code for controlling the function of the security device can be sent by the second transceiver unit. This can occur by the LF module, but can also occur via another HF module within the second transceiver unit. The HF range comprises a frequency range of 3 to 30 MHz.

It is an advantage that other modules with another frequency range can be used, for example in the UHF range. Thereby, a second radio signal can be sent by the cellular phone via the second transceiver unit on the one hand with a low frequency or with a high frequency. High frequency signals have the advantage that a higher information density can be modulated on the carrier frequency. However, high frequency signals need a higher energy for the transmission than low frequency signals. The advantage of low frequency signals is accordingly that these need less energy for the transmission than high frequency signals. This has to be considered in view of the dimensioning of the energy storage for cellular phones. Herein, in the cellular phone a battery, particularly a lithium-ion or a nickel-manganese-hybridbattery can be used. It is therefore an advantage that low frequency signals comprise a low absorption. Thereby, at an equal energy amount a low frequency signal can be calculated with a wider range than with a high frequency signal.

It is an advantage that the authorization code is modulated on the second radio signal via a modulation method. Thereby, for example, a digital phase modulation can be used by which the amplitude stays the same. The modulation type can easily be transcribed in hardware components of the cellular phone due to its modulation and demodulation properties. Moreover, it generates only small interferences to possible adjacent channels.

Further, it is an advantage that the second transceiver unit comprises at least one coil, particularly three separate coils, wherein particularly the coil is assembled at an electronic unit (19), particularly a circuit board. The coil can thereby be aligned horizontally or vertically. Thereby, different transmission and/or receiving directions can be generated. In order to generate an even transceiver area, the coil can preferably comprise three separate coils. Each single coil can be assembled at the electronic unit. The electronic unit can thereby comprise a circuit board, wherein at the circuit board each coil is assembled separately. Each coil comprises a connection with two electric contact elements, wherein each contact element can be connected with a circuit board via a soldering process. The circuit board can comprise at least one conducting path within the area of the contact element connected via the soldering process, wherein the conducting path can be connected in an electrically conducting manner with the conducting path via the soldering process. The conducting path can be connected with further electrical and/or electronical components on the circuit board. Thus, an electric component can be a microprocessor, which can electrically trigger the coil. Thereby, the coil can be coiled about a ferrite core. Particularly the three different coils can be coiled about a ferrite core, wherein their coiling areas can be perpendicular to one another. Likewise, it is possible that the coil is assembled planar on a circuit board upper side or on a circuit board lower side. A circular or a rectangular conducting path can be chosen as a coil geometry. Likewise other geometrical forms are possible. Likewise two separate coils can be used, wherein a first coil is assembled on the circuit board upper side and the second coil is assembled on the circuit board lower side, respectively. The production of planar coils by certain geometric conducting path forms on the circuit board can thereby occur in a cost efficient manner via an etching process.

Advantageously, it is further possible that a coil geometry can be assembled within a circuit board. Thereby, three separate coils can be assembled at the circuit board. A first coil planar on the circuit board upper side, a second coil planar on the circuit board lower side and a third planar coil within the circuit board. The construction can occur via an assembly of at least two circuit boards. A first circuit board can thereby comprise a coil on the first circuit board upper side and the first circuit board lower side. A second circuit board can be assembled with a coil at the first circuit board in the area of the coils of the first circuit board. By a through-connection of the first and/or the second circuit board the single coils can be electrically connected, for example by wires. The coil can be configured as an SMD component (surface mounted device). The SMD component is easily manageable and can be easily foldered on a circuit board without through-connection. Therewith, the first radio signal can be exactly measured in all three directions in space, whereby it is possible to exactly determine between a vehicle interior and vehicle exterior. Thereby, the coil can be connected with an integrated microcontroller via an LF-precursor-IC, wherein the received field strength can be exactly measured in all three directions in space.

Further, it is an advantage that the second transceiver unit is assembled on an external module with a first interface, wherein particularly the cellular phone comprises a second interface which is compatible to the first interface. Thereby, a modular construction of the second transceiver unit is possible. Advantageously, the external module can be inserted in the cellular phone. Thereby, the second transceiver unit can be subsequently integrated into the cellular phone. A subsequent assembly of the second transceiver unit into the cellular phone can thereby be enabled. Therefore, the cellular phone can comprise a housing, wherein the housing comprises an acceptance, whereby the external module with the first interface can be inserted into the acceptance. The external module with a second transceiver unit is insertable into the acceptance, whereby the first interface can be electrically connected with the second interface. An opening of the housing for the insertion of the external module into the cellular phone can thereby be avoided. It is further possible that the cellular phone comprises the second interface in the interior of the housing. Therefore, the housing has to be opened. Since the housing surrounds the second interface, the second interface is effectively protected against contaminations by the housing. The first interface can thereby be configured as a connector, wherein the second interface can be configured as a socket. The connector can thereby comprise metallic contact pins wherein the socket can comprise at least one electrical guidance channel, wherein an electrical contact between the connector and the socket can be generated.

It is an advantage that the second interface comprises a bus system, particularly a universal serial bus (USB). At this area the external module can be connected to the second interface with its first interface. The second interface can be integrated in the interior of the housing of the cellular phone. Thus, the second transceiver unit can be used on the external module with a USB interface. By this integration of the external module in the interior of the housing of the cellular phone the appearance and the haptic of the cellular phone is maintained.

Further it is an advantage that the cellular phone comprises a processor unit, wherein the second transceiver unit is connected with the processor unit. The processor unit is a central component at which almost all electrical components of the cellular phone are connected. Among these are an input field and/or a display. The cellular phone can comprise only one display via which user input is possible. Hereby, it can be a resistive or capacitive display. Moreover, at the processor unit a microphone and a speaker can be assembled. Via the processor unit also the first and second transceiver unit can be controlled. The first transceiver unit can thereby send in an UHF range, wherein the frequency range is in the UHF range between 0.3 and 3 GHz. The second transceiver unit can thereby, like already described, particularly be used in a LF frequency range. The first and/or the second transceiver unit can be controlled via an energy management component which can be connected with the processor unit. The energy management component can be connected with an energy unit, particularly with a battery. Further, also the use of an electrical charging unit is possible. Additionally, further components like for example a SIM module (subscriber identity module) and/or a memory can be electrically connected to the processor unit. Therewith, the processor unit can control the second transceiver unit, particularly the processor unit can control the second transceiver unit via an energy management component.

The objective according to the invention is likewise solved by a method for remotely controlling at least one function of the security device of a vehicle with a cellular phone. The cellular phone comprises a first transceiver unit for establishing a connection with a cellular network. According to the invention it is intended that the cellular phone comprises a second transceiver unit wherein a first radio signal can be received. The cellular phone is turned into an active mode by the received radio signal. In the switched active mode a second radio signal is sent with an authorization code for controlling the function of the security device by the second transceiver unit. An advantage with this method is that as a first radio signal the transmission of a pure frequency, particularly in the LF range, is sufficient. The frequency which can particularly be a frequency of 125 kHz, can thereby remain unmodulated. This means that the cellular phone is automatically turned into an active mode by receiving this frequency. An evaluation of information which can be modulated on the carrier frequency can thereby remain undone in the cellular phone. This means a fast and efficient switch into the active mode. A provided processor performance of the processor unit of the cellular phone can remain undone for the evaluation of modulated information. This means that the second transceiver unit receives the first radio signal as a frequency and thereupon the cellular phone is turned into the active mode. The turning into the active mode can thereby occur by the processor unit and/or an energy management component.

It is thereby an advantage that only frequencies which comprises certain energy can turn the cellular phone into the active mode as the first radio signal. With increasing distance from the source of the transmitting frequency, the amplitude of the frequency decreases. Thus, it is possible that only frequencies with a certain amplitude strength are rated as received by the cellular phone. With the received frequency of a certain amplitude strength the cellular phone is turned into the active mode. Thereby, it is effectively avoided that weak frequencies or frequencies emitted far apart can turn the cellular phone into the active mode.

It has turned out as an advantage that the first radio signal comprises a vehicle identification feature, particularly an encoded vehicle identification feature. Thereby it is effectively avoided that the cellular phone is turned directly into an active mode with the reception of a first radio signal. The cellular phone can extract the vehicle identification feature from the first radio signal, so that only by at least a certain vehicle type with a first radio signal the cellular phone can be turned into an active mode. Thereby, the vehicle identification feature can apply for a certain vehicle type and also can be configured in a way that an explicit identification of the vehicle is modulated on the first radio signal as a vehicle identification feature. Therefore, the vehicle identification feature can be encoded for security reasons so that during a reception of the first radio signal unauthorized users cannot use the vehicle identification feature.

Further, it is an advantage that the authorization code is transmitted in an encoded manner. In order to enable a secure transmission of the authorization code from the cellular phone to the vehicle, different encoding algorithms can be used. Thereby, encoded signals are exchanged between the vehicle and the cellular phone so that it can be determined if the cellular of an authorized user is in the vicinity of the vehicle. The encoding can occur with different bit depths. Thus, for example a 128 bit encoding is advantageous, wherein a 256 bit encoding is preferred.

It is an advantage that the authorization code is transmitted to the cellular phone via a cellular network, particularly encoded. The authorization code can thereby be saved on a server in the internet in an encoded manner. Via a service provider which can particularly be a manufacturer of the vehicle, the user of the cellular phone can have the authorization code transmitted. This can particularly be important when the authorized user of the vehicle wants to use a foreign cellular phone for remotely controlling the function of the security device of the vehicle. It is thereby an advantage that the foreign cellular phone comprises the second transceiver unit for sending the second radio signal with the authorization code. Further it is possible that the vehicle comprises a mobile radio component. This mobile radio component can comprise a data connection with a cellular network. Via this data connection the service provider can directly operate the function of the security device of the vehicle by remotely controlling.

Further it is an advantage that the cellular phone sends a request to the provider for transmitting the authorization codes from the internet. Since the cellular phone comprises a first transmission unit with which a connection with the cellular network can be established, a data connection with the server, which is achievable in the internet, can be established. Thereby, the server can be provided and operated with data by the manufacturer of the vehicle. It is possible to transmit the authorization code to a second cellular phone in case that the user of the vehicle loses its cellular phone. Thereby it is possible that the provider previously performs an authentication of the user of the vehicle. This can for example occur via a previously saved password request. In case that the authorization is positive, the provider can transmit the authorization code to the second cellular phone.

The objective according to the invention is likewise solved by a system for remotely controlling at least one function of a security device of a vehicle with a cellular phone. The vehicle thereby comprises at least one sensor. The result can be registered by the sensor. During registration of the result by the vehicle a first radio signal can be sent by a vehicle related transceiver unit. The first radio signal can be received by the cellular phone, wherein the cellular phone can be turned into an active mode after receiving the first radio signal. Subsequently, a second radio signal can be sent with an authorization code by the second transceiver unit. The second radio signal can be received by a vehicle related transceiver unit. An evaluation of the second radio signal with the authorization code occurs by a vehicle related electronic unit. In case of a positive evaluation of the authorization code an activation of the function of the security device occurs. The security device can thereby be related to a central locking or also a vehicle immobilizer or an electric window regulator. The authorization code can be designed for multiple security device. The sensor can advantageously be a capacity proximity sensor and/or an optical system and/or a radar system.

Further, it is possible that an ultra sound device can be used. An event can be registered via a capacitive proximity sensor, wherein the capacitive proximity sensor is advantageously assembled in the vicinity of a handle of the vehicle door. If the user of a vehicle approaches this sensor, the electrical field alters, wherein the event is an approach to the capacitive proximity sensor by the vehicle. A registration of the approach of a user of the vehicle can thereby occur in an area smaller than one meter. Via the ultrasound device and/or an optical system an approaching of a person can already be detected by the sensor. The event in this case complies with the approaching of a person to the vehicle. Thereby, it can be possible to already register an approach of the user of a vehicle in a distance of more than one meter. Advantageously, the user can thereby be registered in a distance to the vehicle of 10 to 20 meters. The optical system can be equipped with a face recognition software, so that the event is only registered in case of the face recognition of the user of the vehicle.

As a result also a movement sequence can be defined, which for example can be defined by a certain movement pattern of extremities of the user of the vehicle. Thus, for example a clapping of the user in front of the optical system can be recognized, wherein the clapping of the user is registered as an event.

When registering the event via the sensor thereby a transmission of the first radio signal can occur in the LF range, particularly with a frequency of 125 kHz. The cellular phone can thereby receive the first radio signal, wherein the cellular phone is set into an active mode. The first radio signal can additionally carry at least an information, wherein initially an evaluation of the information occurs by the cellular phone. Thus, in case of a positive evaluation of the information, the cellular phone can be set into the active mode. Within the active mode the cellular phone sends a second radio signal with an authorization code. The authorization code can be modulated on the second radio signal.

Thereby, the cellular phone can contain multiple authorization codes for different functions of the security device within a memory. The second radio signal can thereby be received by a vehicle related transceiver unit. A vehicle related processor unit evaluates the authorization codes. With a positive evaluation an activation of the function of the security device occurs. The security device can thereby control multiple functions like for example electric window regulators and/or electric vehicle immobilizer and/or an electromechanical steering lock. Advantageously, a locking and/or unlocking of a vehicle door, a hatchback or a tank cap of the vehicle can occur by the security device. Further it is possible that via the security device an automatic opening or closing of moveable vehicle components like for example the vehicle door, the hatchback or the tank cap can occur. Thereby, different authorization codes can be controlled by the second radio signal for the activation of different functions of the security device.

Figure 2:
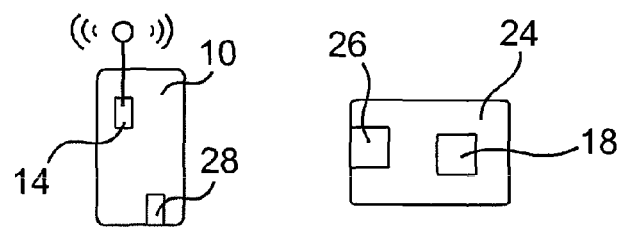
Figure 3:
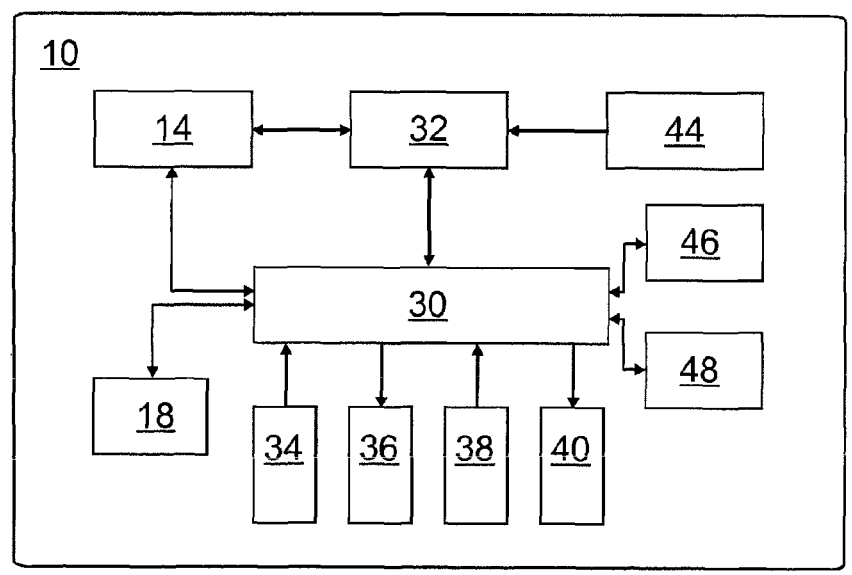
Figure 4:
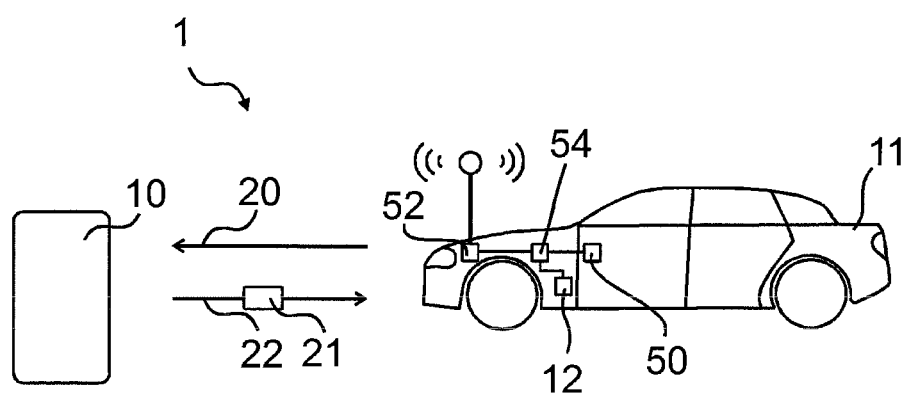

Further features and advantages of the invention result from the claims, the subsequent description and the drawings. Likewise, the disclosed features of the device according to the invention apply also for the method according to the invention, the system according to the invention and vice versa. In the drawings the invention is shown in multiple embodiments. Thereby, the features described in the claims and in the description can be essential for the invention each single for itself or in any combination. It is shown:

FIG. 1 a schematic view of a cellular phone for remotely controlling of a function of a security device of a vehicle, FIG. 2 a schematic view of a cellular phone with an integrable external module, FIG. 3 a schematic assembly of a cellular phone, and FIG. 4 a schematic view of a system for remotely controlling a function of a security device of a vehicle with a cellular phone.

In FIG. 1 a cellular phone 10 is shown schematically for remotely controlling of at least one function of a security device 12 of a vehicle 11. The cellular phone 10 thereby comprises a first transceiver unit 14. Via the first transceiver unit 14 a connection with a cellular network 16 can be established. The connection can thereby consist of a data and voice connection. The assembly of the connection can occur via the GSM, GPRS, UMTS or LTE standard. The cellular phone 10 comprises a second transceiver unit 18, wherein a first radio signal 20 can be received. An electronic unit 19 is assembled at the second transceiver unit 18. At least one coil is assembled at the electronic unit, wherein the first radio signal 20 can be received by the coil. The electronic unit 19 can thereby comprise a circuit board at which the coil is assembled. The first radio signal 20 can thereby be within a LF range, can particularly receive a frequency of 125 kHz. Information can be modulated on the frequency of 125 kHz, which is used as a carrier frequency. Herein different modulation types can be used. It is thereby possible for the cellular phone 10 to receive the carrier frequency as a first radio signal 20 via the second transceiver unit 18, particularly by the electronic unit 19. When receiving the first radio signal 20 the cellular phone 10 is turned into an active mode. Thereby, the transmission of a second radio signal 22 occurs by the second transceiver unit 18 with an authorization code 21. The vehicle 11 can thereby receive the second radio signal 22 with the authorization code 21, wherein a function of the security device 12 can be performed, which is assembled at the vehicle 11. The receipt of the second radio signal 22 occurs via a vehicle related transceiver unit 52, which is assembled at the vehicle 11. The vehicle related transceiver unit 52 can thereby serve for transmitting the first radio signal 20. In order to not permanently set the cellular phone 10 into the active mode during a receipt of the first radio signal 20 with only a certain frequency, a vehicle identification feature can be modulated to the first radio signal 20, particularly an encoded vehicle identification feature 23. This vehicle identification feature 23 can be evaluated by the cellular phone 10 previous to setting the active mode of the cellular phone 10. In case of a positive evaluation of the modulated vehicle identification feature 23 as an information of the received radio signal 20, then the setting of the cellular phone 10 into the active mode occurs.

In FIG. 2 a cellular phone 10 with an external module 24 is shown schematically. The cellular phone 10 comprises a first transceiver unit 14 with which a connection with a cellular network 16 can be established. The cellular phone 10 comprises a second interface 28. In this second interface 28 the external module 24 can be applied with a compatible first interface 26. Advantageously, the external module 24 comprises the second transceiver unit 18. Thereby, a cellular phone 10 can be subsequently refitted with a second transceiver unit 18.

In FIG. 3 a schematic assembly of a cellular phone 10 is shown. The center piece is a processor unit 30. At this processor unit 30 essential components like a microphone 34, a speaker 36, a keypad 38 and a display 40 are assembled. By the use of a touch display the keypad can be omitted. A SIM module 48 is assembled at the processor unit 30 on which identification features of a user are saved. Thereby, the user of the cellular phone 10 can be identified. The processor unit 30 comprises a memory 46, in which particularly authorization codes 21 can be saved. The saving of the authorization codes 21 can thereby be encoded. An energy management component 32 is regulated via a processor unit 30. An energy unit 44 is assembled at an energy management component 32. For the establishment of a connection with the cellular network the first transceiver unit 14 is likewise connected to the processor unit 30. Since the processor unit 30 centrally administers all necessary information, the second transceiver unit 18 is also assembled at the processor unit 30. The second transceiver unit 18 can thereby comprise different frequency modules, which can transmit and receive frequencies in different frequency bands.

In FIG. 4 a schematic view of a system 1 for remotely controlling at least one function of a security device 12 of a vehicle 11 is shown with a cellular phone 10. The vehicle 11 thereby comprises a sensor. This sensor 50 can register an event. The sensor 50 can thereby be for example a capacitive proximity sensor, wherein this capacitive proximity sensor can register the approaching as an event during an approaching of the user to the vehicle. In case that the sensor 50 has registered the event, a first radio signal 20 is sent by the vehicle related transceiver unit 52. The first radio signal 20 can be received by the cellular phone 10, wherein the cellular phone 10 is set into an active mode during the receipt of the first radio signal. Thereupon the cellular phone 10 sends a second radio signal 22 with an authorization code 21. The first radio signal 20 can contain different information 23 which can be evaluated by the cellular phone 10. After sending a second radio signal 22 with an authorization code 21 by the cellular phone 10 this can be received by the vehicle related transceiver unit 52. Herein, a processor unit 54 is used, which evaluates the authorization code 21 and in case of a positive evaluation controls a function of a security device 12. Thereby different functions of the security device 12 can be controlled by the processor unit 54.

The statements of the feature descriptions of the cellular phone 10 in FIG. 1 can be combined with the features of the cellular phone 10 in FIGS. 2 to 4 and vice versa. This likewise applies for all feature combinations which can result from FIGS. 1 to 4.

REFERENCE LIST

10 Cellular phone
11 Motor vehicle
12 Security device
14 First transceiver unit
16 Cellular network
18 Second transceiver unit
20 First radio signal
21 Authorization code
22 Second radio signal
23 Vehicle identification feature
24 External module
26 First interface
28 Second interface
30 Processor unit
32 Energy management component
34 Microphone
36 Speaker
38 Keypad
40 Display
44 Energy unit
46 Memory
48 SIM module
50 Sensor
52 Vehicle related transceiver
54 Processor unit

The invention claimed is:

1. A cellular phone (10) for remotely controlling at least one function of a security device (12) of a vehicle (11), wherein the cellular phone (10) comprises a first transceiver unit (14), wherein a connection with a cellular network (16) can be established, characterized in that
the cellular phone (10) comprises a second transceiver unit (18), wherein the second transceiver unit (18) comprises an LF module, wherein the LF module operates in an LF-frequency band with a frequency range of 30 kHz to 300 kHz, wherein the second transceiver unit (18) receives an LF-alarm which comprises a frequency of 125 kHz, wherein the second transceiver unit (18) receives the LF-alarm as a first radio signal (20), wherein the cellular phone (10) is turned into an active mode by the received first radio signal (20) and in the turned active mode a second radio signal (22) with an authorization code (21) can be sent for controlling the function of the security device (12) by the second transceiver unit (18), wherein the second transceiver unit (18) is located in an external module (24) having a first interface (26), wherein the cellular phone (10) comprises a second interface (28) that is compatible to the first interface (26), and wherein the external module (24) can be removably inserted into the cellular phone (10) such that the first interface is electrically connected with the second interface.

2. The cellular phone (10) according to claim 1, characterized in that
the second transceiver unit (18) comprises at least one coil, particularly three separate coils, wherein particularly the coil is assembled at an electronic unit (19), particularly on a circuit board.

3. The cellular phone (10) according to claim 1, characterized in that
the external module (24) can be refitted for the cellular phone (10).

4. The cellular phone (10) according to claim 1, characterized in that
the second interface (28) comprises a bus system, particularly a universal serial bus (USB).

5. The cellular phone (10) according to claim 1, characterized in that
the authorization code (21) is modulated to the second radio signal (22) via a modulation method.

6. A method for remotely controlling at least one function of a security device (12) of a vehicle (11) with a cellular phone (10), wherein the cellular phone (10) comprises a first transceiver unit (14) for establishing a connection with a cellular network (16), characterized in that,
the cellular phone (10) sends a request to a provider for transmitting an authorization code (21) from the internet, wherein the cellular phone (10) comprises a second transceiver unit (18), wherein the second transceiver unit (18) comprises an LF module, wherein the LF module operates in an LF-frequency band with a frequency range of 30 kHz to 300 kHz, wherein the second transceiver unit (18) receives an LF-alarm which comprises a frequency of 125 kHz, wherein the second transceiver unit (18) receives the LF-alarm as a first radio signal (20), wherein the cellular phone (10) is turned into an active mode by the received first radio signal and in the turned active mode a second radio signal (22) with an authorization code (21) is sent for controlling the function of the security device (12) by a second transceiver unit (18).

7. The method according to claim 6, characterized in that the first radio signal (20) comprises a vehicle identification feature, particularly an encoded vehicle identification feature.

8. The method according to claim 6, characterized in that the authorization code (21) is transmitted in an encoded manner.

9. The method according to claim 6, characterized in that the authorization code (21) is transmitted to the cellular phone (10) via a cellular network (16), particularly encoded.

10. The method according to claim 6, characterized in that the authorization code (21) is transmitted to the cellular phone (10) via a radio interface, particularly via Bluetooth.

11. The cellular phone (10) according to claim 1, characterized in that
the second transceiver unit (18) comprises at least one coil, particularly three separate coils, wherein particularly the coil is assembled at an electronic unit (19), particularly on a circuit board.

12. The cellular phone (10) according to claim 1, characterized in that
the second transceiver unit (18) is assembled at an external module (24) with a first interface (26), wherein particularly the cellular phone (10) comprises a second interface (28), which is compatible to the first interface (26).

13. The cellular phone (10) according to claim 2, characterized in that
the second transceiver unit (18) is assembled at an external module (24) with a first interface (26), wherein particularly the cellular phone (10) comprises a second interface (28), which is compatible to the first interface (26).

14. The method according to claim 7, characterized in that the authorization code (21) is transmitted in an encoded manner.

15. The method according to claim 7, characterized in that the authorization code (21) is transmitted to the cellular phone (10) via a cellular network (16), particularly encoded.

* * * * *